US009853841B1

(12) United States Patent
Ho

(10) Patent No.: US 9,853,841 B1
(45) Date of Patent: Dec. 26, 2017

(54) LOW COMPLEXITY SLICER ARCHITECTURES FOR N-TAP LOOK-AHEAD DECISION FEEDBACK EQUALIZER (DFE) CIRCUIT IMPLEMENTATIONS

(71) Applicant: Huong Ho, Woodlawn (CA)

(72) Inventor: Huong Ho, Woodlawn (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/271,735

(22) Filed: Sep. 21, 2016

Related U.S. Application Data

(60) Provisional application No. 62/353,926, filed on Jun. 23, 2016.

(51) Int. Cl.
*H03K 5/159* (2006.01)
*H04L 25/03* (2006.01)

(52) U.S. Cl.
CPC *H04L 25/03057* (2013.01); *H04L 2025/0349* (2013.01)

(58) Field of Classification Search
CPC ......... H04L 25/3057; H04L 2025/0349; H04L 27/06; H04L 27/01
USPC ........ 375/233, 232, 350; 708/322, 323, 497, 708/551
See application file for complete search history.

(56) References Cited

U.S. PATENT DOCUMENTS

| | | | | |
|---|---|---|---|---|
| 6,751,255 | B1 | 6/2004 | Reuven et al. | |
| 2001/0023425 | A1 * | 9/2001 | Oberman ................. | G06F 7/53 708/620 |
| 2007/0140329 | A1 | 6/2007 | Zhang et al. | |
| 2014/0099116 | A1 | 4/2014 | Bai et al. | |
| 2015/0319015 | A1 | 11/2015 | Malhotra | |

(Continued)

FOREIGN PATENT DOCUMENTS

| | | | |
|---|---|---|---|
| CN | 103107964 | A | 5/2013 |
| CN | 105024958 | A | 11/2015 |
| GB | 2296845 | A | 7/1996 |

OTHER PUBLICATIONS

Kogge and Stone; "A Parallel Algorithm for the Efficient Solution of a General Class of Recurrence Equations"; IEEE Transactions on Computers, vol. C-22, No. 8, Aug. 1973; pp. 786-793.

(Continued)

*Primary Examiner* — Khai Tran

(57) ABSTRACT

A slicer circuit for use in a N-tap, S-bit symbol look-ahead decision feedback equalizer (DFE) wherein the slicer comprises overflow adders and sign adders, the slicer circuit including a first processing path for generating, based on a signal sample y(n), a most significant bit (MSB) for each of $2^{S*N}$ possible output symbols of the DFE, the first processing path including $(2^{S*N})/2$ overflow adder circuits, and a second processing path for generating, based on the signal sample y(n), a least significant bit (LSB) for each of the $2^{S*N}$ possible output symbols, the second processing path including $2^{S*N}$ sign adder circuits.

20 Claims, 8 Drawing Sheets

100

(56) References Cited

U.S. PATENT DOCUMENTS

2015/0319017 A1 11/2015 Huang et al.
2016/0291934 A1* 10/2016 Czajkowski ............ G06F 17/10

OTHER PUBLICATIONS

Rani and Kumar; "Delay Analysis of Parallel-Prefix Adders"; International Journal of Science and Research (IJSR), vol. 3 Issue 6, Jun. 2014.

* cited by examiner 202 204

$$Qa(n) = (y(n) + 3C) - T$$
$$Qb(n) = (y(n) + C) - T$$
$$Qc(n) = (y(n) - C) - T$$
$$Qd(n) = (y(n) - 3C) - T$$

LOW COMPLEXITY SLICER ARCHITECTURES FOR N-TAP LOOK-AHEAD DECISION FEEDBACK EQUALIZER (DFE) CIRCUIT IMPLEMENTATIONS

RELATED APPLICATIONS

This application claims priority to and the benefit of U.S. Provisional Patent Application No. 62/353,926 filed Jun. 23, 2016, incorporated herein by reference.

BACKGROUND

The present description relates to slicer circuits used in decision feedback equalizer (DFE) circuit implementations.

Digital receivers operate by sampling an analog waveform and detecting the sampled data. Signals arriving at a receiver are typically corrupted by crosstalk, echo, intersymbol interference (ISI), and other noise. As a result, a receiver must equalize the channel to compensate for signal corruption and also decode the encoded signal. Decision feedback equalization, which may for example employ a nonlinear equalizer to equalize the channel using a feedback loop based on previously decided symbols, can be used to remove ISI and other noise. Some DFE configurations use slicers to quantize a signal to a binary "1" or "0" based on the sampled value and a slicer threshold. Conventionally, a slicer designed to perform signal equalization and quantization to generate S-bit output of a N-tap look-ahead DFE requires at least $2*(2^{S*N})$ adders/subtractors. For example, to generate 2-bit output symbols for a 2-tap look-ahead DFE, a slicer would normally be required to compute 32 parallel additions/subtractions. Since adders are a main source of timing bottlenecks in DSP circuits, using too many layers of adders for circuit implementations can result in a slicer with long critical path. As a consequence, registers are required to pipeline the slicer circuit, adding more hardware resources to the design.

Accordingly, there is a need for improved slicer circuit architecture for use in decision feedback equalizer circuit implementations.

SUMMARY

In at least some example embodiments there is provided a low complexity slicer architecture for N-tap look-ahead decision feedback equalizer (DFE) circuit implementations. In some configurations, the slicers disclosed are suitable for N-tap look-ahead DFE circuit implementations that target high-speed data link applications. In such circuits, the slicers perform equalization of N-tap DFE input signals and then generate the S-bit symbol output of the equalized signals.

According to an example embodiment, a slicer circuit is described for use in a N-tap, S-bit symbol look-ahead decision feedback equalizer (DFE) circuit configured to receive a signal sample y(n) and generate a corresponding estimated output symbol x(n). The slicer circuit includes a first processing path for generating, based on the signal sample y(n), a most significant bit (MSB) for each of $2^{S*N}$ possible output symbols of the DFE, the first processing path including $(2^{S*N})/2$ overflow adder circuits. The slicer circuit also includes a second processing path for generating, based on the signal sample y(n), a least significant bit (LSB) for each of the $2^{S*N}$ possible output symbols, the second processing path including $2^{S*N}$ sign adder circuits.

In some examples, the first processing path includes a temporary value generate circuit preceding the overflow adder circuits and a generate MSB circuit following the overflow adder circuits. The temporary value generate circuit generates, based on a sign of the signal sample y(n), $(2^{S*N})/2$ temporary value sets each comprising a temporary sum and a temporary carry value. Each of the overflow adder circuits determines, for a respective temporary value set, a respective overflow bit resulting from addition of the temporary sum and temporary carry value of the temporary value set. The generate MSB circuit generates the most significant bit (MSB) for each of the $2^{S*N}$ possible output symbols based on the sign of the signal sample y(n) and the overflow bits determined by the overflow adder circuits.

In some embodiments, the second processing path includes $2^{S*N}$ carry save adder (CSA) circuits preceding the sign adder circuits and a generate LSB circuit following the sign adder circuits, the CSA circuits each being configured to compress multi-element additions into corresponding compressed additions that include a reduced number of elements, the elements of the multi-element additions comprising the signal sample y(n), a slicer threshold T and N tap coefficients. Each of the sign adder circuits is configured to determine a respective sign resulting from addition of a respective one of the compressed additions. The generate LSB circuit is configured to generate the LSB for each of the $(2^{S*N})$ possible output symbols based on the signs determined in respect of the compressed additions.

According to another example embodiment, a method is described for slicing a received signal sample y(n) to generate a plurality of possible output symbols in an N-tap, S-bit symbol look-ahead decision feedback equalizer (DFE) circuit. The method includes generating, using $(2^{S*N})/2$ overflow adder circuits and based on the received signal sample y(n), a most significant bit (MSB) for each of $2^{S*N}$ possible output symbols of the DFE; and generating, using $2^{S*N}$ sign adder circuits and based on the received signal sample y(n), a least significant bit (LSB) for each of the $2^{S*N}$ possible output symbols.

In some example embodiments, generating the MSB for each of the possible output symbols comprises: generating, based on a sign of the signal sample y(n), $(2^{S*N})/2$ temporary value sets each comprising a temporary sum and a temporary carry value; determining, using a respective one of the overflow adder circuits for each of the temporary value sets, a respective overflow bit resulting from addition of the temporary sum and temporary carry value of the temporary value set; and generating the most significant bit (MSB) for each of the $2^{S*N}$ possible output symbols based on the sign of the signal sample y(n) and the overflow bits determined by the overflow adder circuits.

In some example embodiments, generating the LSB for each of the $2^{S*N}$ possible output symbols comprises: compressing multi-element additions into corresponding compressed additions that include a reduced number of elements, the elements of the multi-element additions comprising the signal sample y(n), a slicer threshold T and N tap coefficients; determining, using a respective one of the adder circuits for each of the compressed additions, a respective sign resulting from addition of the compressed additions; and generating the LSB for each of the $2^{S*N}$ possible output symbols based on the signs determined in respect of the compressed additions.

According to a further example embodiment, an N-tap, S-bit look-ahead decision feedback equalizer (DFE) circuit is described. The DFE circuit is configured to receive a signal sample y(n) and generate a corresponding estimated output symbol x(n). The DFE circuit includes a slicer circuit configured to generate possible output symbols of the DFE based on the signal sample y(n), a slicer threshold T and N tap coefficients. The slicer circuit includes a first processing path for generating, based on the signal sample y(n), slicer threshold T and N tap coefficients, a most significant bit (MSB) for each of the possible output symbols of the DFE, the first processing path including ½($2^{S*N}$) overflow adder circuits. The slicer circuit also includes a second processing path for generating, based on the signal sample y(n), slicer threshold T and N tap coefficients, a least significant bit (LSB) for each of the possible output symbols of the DFE, the second processing path including $2^{S*N}$ sign adder circuits. The DFE circuit also includes a multiplexer configured to, based on a previously estimated output signal, selectively output the estimated output symbol x(n) from among the possible output symbols generated by the slicer circuit.

DETAILED DESCRIPTION

Example embodiments are described below of a high speed slicer that can be used in implementations of an N-tap look ahead DFE circuit where N is the number of taps. In at least some embodiments, the slicer may generate S-bit symbol outputs using fewer hardware resources compared to conventional techniques and may also have a shorter critical path, resulting in higher data throughput compared to conventional architectures.

Figure 1A:
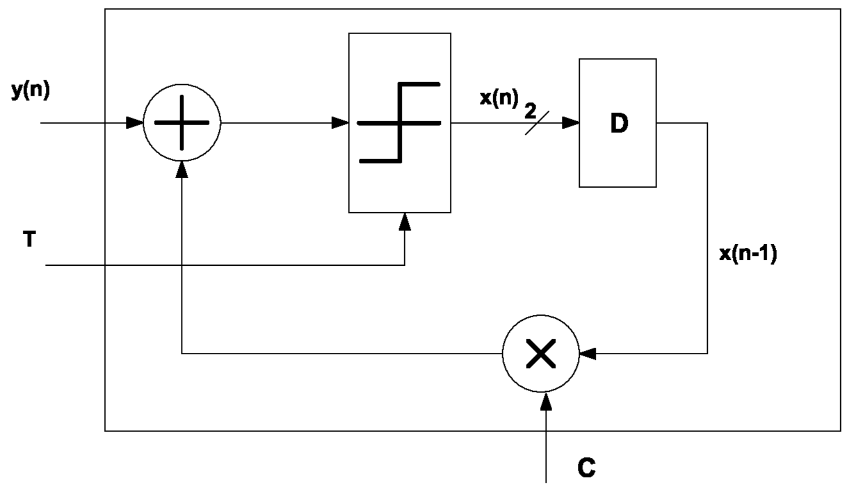
FIG. 1A is a block diagram of a 1-tap 4 pulse-amplitude modulation (PAM-4) DFE, according to an example embodiment.
Figure 1B:
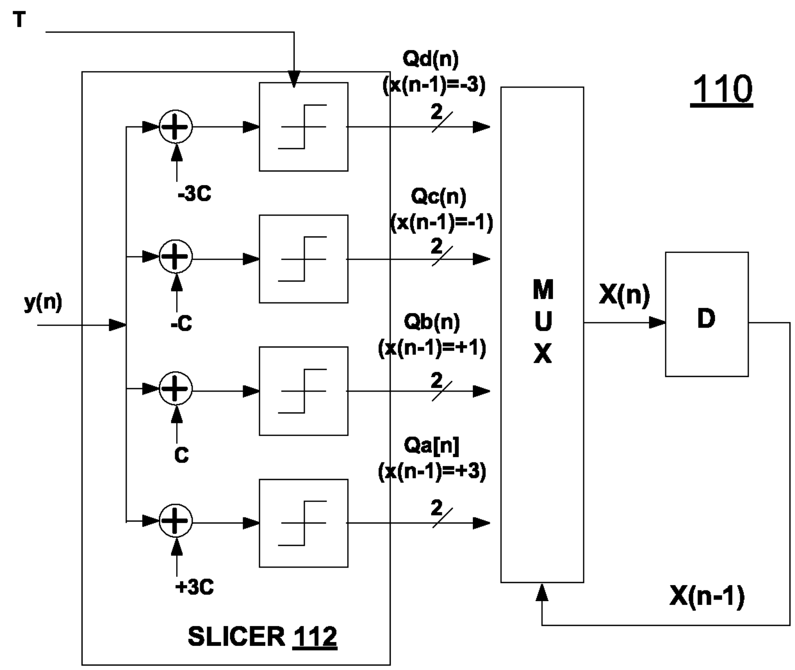
FIG. 1B is a schematic representation of the look-ahead/unrolled architecture of the 1-tap, PAM-4 DFE circuit of FIG. 1A.

FIGS. 1A and 1B respectively show a 1-tap, PAM-4 DFE 100 and a look-ahead architecture of a 1-tap, PAM-4 DFE circuit 110, which includes a slicer 112, according to example embodiments. In FIGS. 1A and 1B, "y(n)" is a received signal sample that represents a symbol in a progression of received symbols, "x(n)" represents the corresponding recovered digital symbol (which is the binary decision output by the slicer), "x(n−1)" represents the recovered digital symbol for the previous received signal sample (feedback through delay gate D). T represents the threshold value applied at the slicer. In a PAM 4 DFE circuit, received signal sample y(n) will represents one of four distinct amplitude levels, such that the recovered symbol x(n) will be a combination of two bits from the set (00, 01, 11, 10). C is the tap coefficient for the 1-tap DFE circuit 100, 110, and in example embodiments is represented in two's compliment format consisting of B bits, where B is an unsigned integer, for example, 1, 2, 3, 4 . . . , etc.

In FIG. 1B, the DFE circuit has been unrolled to represent slicing at each of the four distinct amplitude levels of a PAM 4 architecture (Qa(n), Qb(n), Qc(n) and Qd(n)). Qa(n), Qb(n), Qc(n) and Qd(n) each represent a 2 bit output and are each applied to multiplexer MUX, which then outputs recovered symbol x(n) based on previously recovered signal x(n−1). As the number of taps N=1 in the circuits of FIGS. 1A and 1B, such circuits have only a single feedback loop.

Figures 2, 3:
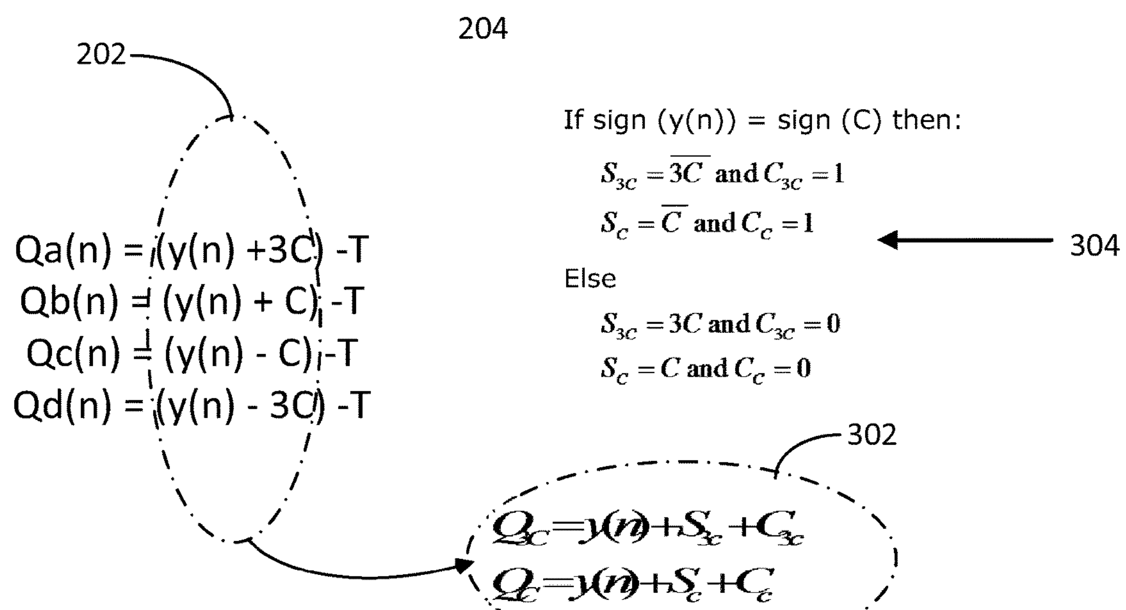
FIG. 2 shows an equation set representation of slicer outputs for a 1-tap, PAM 4 slicer.
FIG. 3 shows an equation set representation of most significant bit (MSB) calculations done by a slicer according to an example embodiment.

Equation set (1A) below, which is also shown in FIG. 2, models the output of slicer 112, where T is the slicer threshold, for an N-tap, S-bit look-ahead DFE where N=1, S=2:

$$Q_a(n)=(y(n)+3C)-T$$

$$Q_b(n)=(y(n)+C)-T$$

$$Q_c(n)=(y(n)-C)-T$$

$$Q_d(n)=(y(n)-3C)-T \qquad (1A)$$

Equation set (1B) below models the output of slicer, where T is the slicer threshold, for an N-tap, S-bit look-ahead DFE where N=2, S=2:

$$Q_{a1}(n)=(y(n)+3C1+3C2)-T$$

$$Q_{a2}(n)=(y(n)+3C1+C2)-T$$

$$Q_{a3}(n)=(y(n)+3C1-C2)-T$$

$$Q_{a4}(n)=(y(n)+3C1-3C2)-T \qquad (1B)$$

For an N-tap, S-bit look-ahead DFE (unrolling/unfolding), conventional slicer implementations require $2*(2^{S*N})$ adders. For example, for a 1 tap (N=1), 2-bit (S=2) DFE, the slicer will require a total of 8 adders to generate the 2-bit output of Qa, Qb, Qc, and Qd. In particular, each 2-bit output of Qa/Qb/Qc/Qd requires, with reference to FIG. 2, a first stage of addition 202 to compute for the sum within the parentheses and a second stage of addition 204 for applying the threshold T. As can be appreciated from the equation set (1B) above for the N=2 case, for a large N, a large number of adders is required, such that N>=2 can result in a long critical path and long delay.

Accordingly, example embodiments described below are directed to a slicer architecture for slicer 112 that uses a reduced number of adders. According to one example embodiment, the partial products generated by the 4 additions of the first stage of addition 202 can be calculated using only 2 overflow bit generated adders, and the second stage of addition 204 requires 4 sign bit generated adders. In addition to requiring 6 adders instead of the 8 adders required using a conventional architecture, the actual adders themselves (ex. overflow bit and sign bit generated adders)

used in the slicer architecture presented below require less gates than the adders used in a conventional slicer.

In this regard, an example of a slicer architecture will now be described in the context of a 1-tap (N=1) 4 pulse-amplitude modulation (PAM-4) (S=2) DFE architecture.

The reduction of the 4 additions of the first stage of addition 202 to 2 overflow bit generated adders is based on the following algorithm according to an example embodiment:

Step1:

Define temporary sums S3C, SC and temporary carry C3C, CC:

If sign $(y(n))$=sign $(C)$ then:

$$S_{3C}=\overline{3C} \text{ and } C_{3C}=1$$

$$S_C=\overline{C} \text{ and } C_C=1$$

Else $$S_{3C}=3C \text{ and } C_{3C}=0$$

$$S_C=C \text{ and } C_C=0$$

Step2:

Perform 2 additions:

$$Q_{3C}=y(n)+S_{3c}+C_{3c}$$

$$Q_C=y(n)+S_c+C_c \quad (2)$$

Note that $Q_{3C}$ and $Q_C$ are each generated using only one adder. The Most Significant Bit (MSB) of Qa(n), Qb(n), Qc(n), and Qd(n) are then calculated as follows:

If sign $(y(n))$=sign $(C)$ then:

$$Qa(n)_{[MSB]}=1 \text{ if } y(n)>0 \text{ else } Qa(n)_{[MSB]}=0$$

$$Qb(n)_{[MSB]}=1 \text{ if } y(n)>0 \text{ else } Qb(n)_{[MSB]}=0$$

$$Qc(n)_{[MSB]}=1 \text{ if } Q_C>0 \text{ else } Qc(n)_{[MSB]}=0$$

$$Qd(n)_{[MSB]}=1 \text{ if } Q_{3C}>0 \text{ else } Qd(n)_{[MSB]}=0 \quad (3)$$

else $$Qa(n)_{[MSB]}=1 \text{ if } Q_{3C}>0 \text{ else } Qa(n)_{[MSB]}=0$$

$$Qb(n)_{[MSB]}=1\ Q_C>0 \text{ else } Qb(n)_{[MSB]}=0$$

$$Qc(n)_{[MSB]}=1 \text{ if } y(n)>0 \text{ else } Qc(n)_{[MSB]}=0$$

$$Qd(n)_{[MSB]}=1 \text{ if } y(n)>0 \text{ else } Qd(n)_{[MSB]}=0 \quad (4)$$

Figure 4:
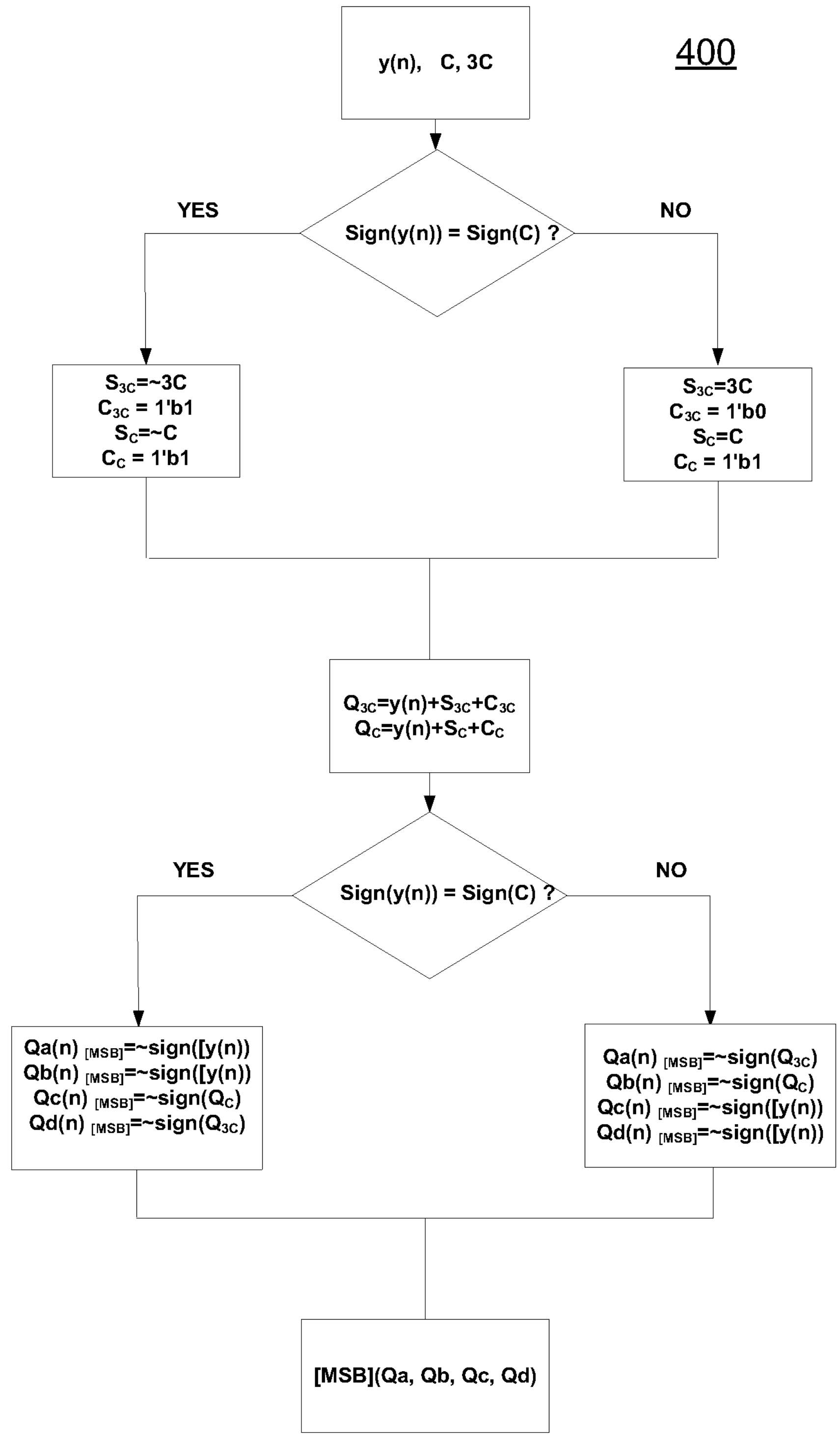
FIG. 4 is a flow chart illustrating methodology for calculating most significant bits (MSBs) for Qa, Qb, Qc, and Qd of FIGS. 2 and 3.

The algorithm described steps 1 and 2 and equation sets (2)-(4) above can be represented in the diagram of FIG. 3 and the flow chart 400 shown in FIG. 4, which illustrates how the first stage of addition 202 can be implemented using only 2 additions (see equations 302) to calculate the most significant bits (MSBs) for Qa, Qb, Qc and Qd.

Referring again to the MSB outputs of Qa(n), Qb(n), Qc(n), and Qd(n) shown in equation sets (3) and (4), it will be noted that these outputs have been determined based on the sign of y(n), $Q_{3C}$, and $Q_C$. Thus, it is necessary to only check if the additions computed by the 2 adders in equation set (2) generated any overflow. If there is an overflow, the sign of y(n), $Q_{3c}$, and $Q_C$ is greater or equal to zero. The sign of y(n), $Q_{3C}$, and $Q_C$ is smaller than zero otherwise. As a result, instead of using conventional adders to compute for the output in equation set (3), the slicer only needs to compute the overflow of the additions depicted in equation set (2).

Once the MSBs of Qa(n), Qb(n), Qc(n), and Qd(n) are determined, the least significant bits (LSBs) of can be calculated using 4 adders. First, the 3 input additions depicted in each row of equation set (1A) can be compressed into 2 input additions as represented in equation set (5) below:

$$Q_a(n)=(y(n)+3C)-T \Rightarrow A1+A2$$

$$Q_b(n)=(y(n)+C)-T \Rightarrow B1+B2$$

$$Q_c(n)=(y(n)-C)-T \Rightarrow C1+C2$$

$$Q_d(n)=(y(n)-3C)-T \Rightarrow D1+D2 \quad (5)$$

Figure 5A:
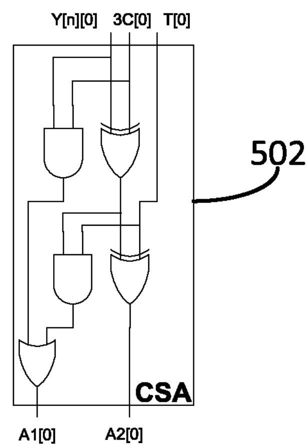
FIG. 5A is a block diagram showing gate level architecture of 1-bit carry save adder (CSA), according to an example embodiment.
Figure 5B:
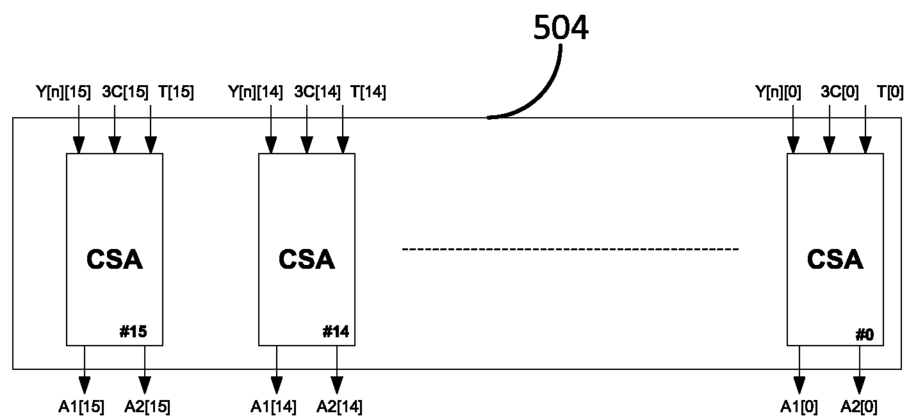
FIG. 5B is a block diagram showing the architecture of a 16-bit CSA formed from 16 of the CSAs of FIG. 5A.

Each compression of 3 elements into 2 elements as shown in equation set (5) requires only a 3 to 2 compressor Carry Save Adder (CSA). FIG. 5A and FIG. 5B depict the gate level architectures of a 1-bit CSA 502 and a 16-bit CSA circuit 504, respectively, used to compress the 3 elements y(n), 3C, and T (in the case of Qa(n)) into 2 elements A1 and A2, respectively. Similar CSAs are used for each of Qb(n), Qc(n) and Qd(n).

As shown below in equation set (6), the sum of A1 and A2 can be used to determine the LSB of Qa(n). The compression of the 3 elements y(n), 3C, and T into 2 elements A1 and A2 in respect of Qa(n), and the corresponding compressions for each of Qb(n), Qc(n) and Qd(n), permits a total of 4 adders to be used to compute the outputs (A1+A2, B1+B2, C1+C2 and D1+D2) described in equation set (5), from which the LSBs of Qa(n), Qb(n), Qc(n) and Qd(n) can be determined as follows:

if $A1+A2>0$ $$Q_a(n)[LSB]=\text{'1'}$$

else $$Q_a(n)[LSB]=\text{'0'} \quad (6)$$

if $B1+B2>0$ $$Q_b(n)[LSB]=\text{'1'}$$

else $$Q_b(n)[LSB]=\text{'0'} \quad (7)$$

if $C1+C2>0$ $$Q_c(n)[LSB]=\text{'1'}$$

else $$Q_c(n)[LSB]=\text{'0'} \quad (8)$$

if $D1+D2>0$ $$Q_d(n)[LSB]=\text{'1'}$$

else $$Q_d(n)[LSB]=\text{'0'} \quad (9)$$

An example of a physical architecture that can be applied to slicer 112 of DFE 110 to implement the slicer methodology described above is shown in FIG. 6. The slicer 112 receives signal sample y(n), summing coefficients C and 3C, and slicing threshold T as inputs, and outputs four two-bit values: Qa(n) [MSB, LSB], Qb(n) [MSB, LSB], Qc(n)

[MSB, LSB], and Qd(n) [MSB, LSB], that correspond to the four possible binary values of DFE output symbol x(n) (in the case of a PAM 4 architecture; generalized, the number of possible outputs is $2^{S*N}$). In example embodiments, slicer 112 is hardware implemented using appropriately configured logic gates.

The slicer 112 includes an MSB processing path 610 that implements the process shown in flowchart 400 (see FIG. 4) for determining the MSB values for Qa(n), Qb(n), Qc(n) and Qd(n). In this regard, the MSB processing path 610 includes: temporary value generate circuit 602, two overflow adder circuits OVF_ADD 604-1 and 604-2, and an MSB generate circuit 605. The slicer 112 also includes an LSB processing path 612 for determining the LSB values for Qa(n), Qb(n), Qc(n) and Qd(n) according to the equation sets (5), (6) and (7) set out above. The LSB processing path 612 includes: four carry save adders (CSAs) 504, four sign-adder circuits S_ADD 604-1 to 604-4, and an LSB generate circuit 608.

With respect to MSB processing path 610, the temporary generate circuit 602 includes logic gates configured to implement algorithm 304 (see FIG. 3) to determine temporary sums S3C, SC and temporary carry values C3C, CC based on the signs of y(n) and C. The two overflow adders 604-1 and 604-2 are configured to respectively output temporary values Q3*c* and Qc (carry over bits) in accordance with equations 302 (see FIG. 3) based on y(n) and the temporary values S3C, C3C and values SC, CC. MSB generate circuit 605 includes logic gates configured to implement equation sets (3) and (4) described above in order to determine MSB values for Qa(n), Qb(n), Qc(n) and Qd(n) in dependence on the signs of y(n), C, Q3*c* and Qc.

Figure 7:
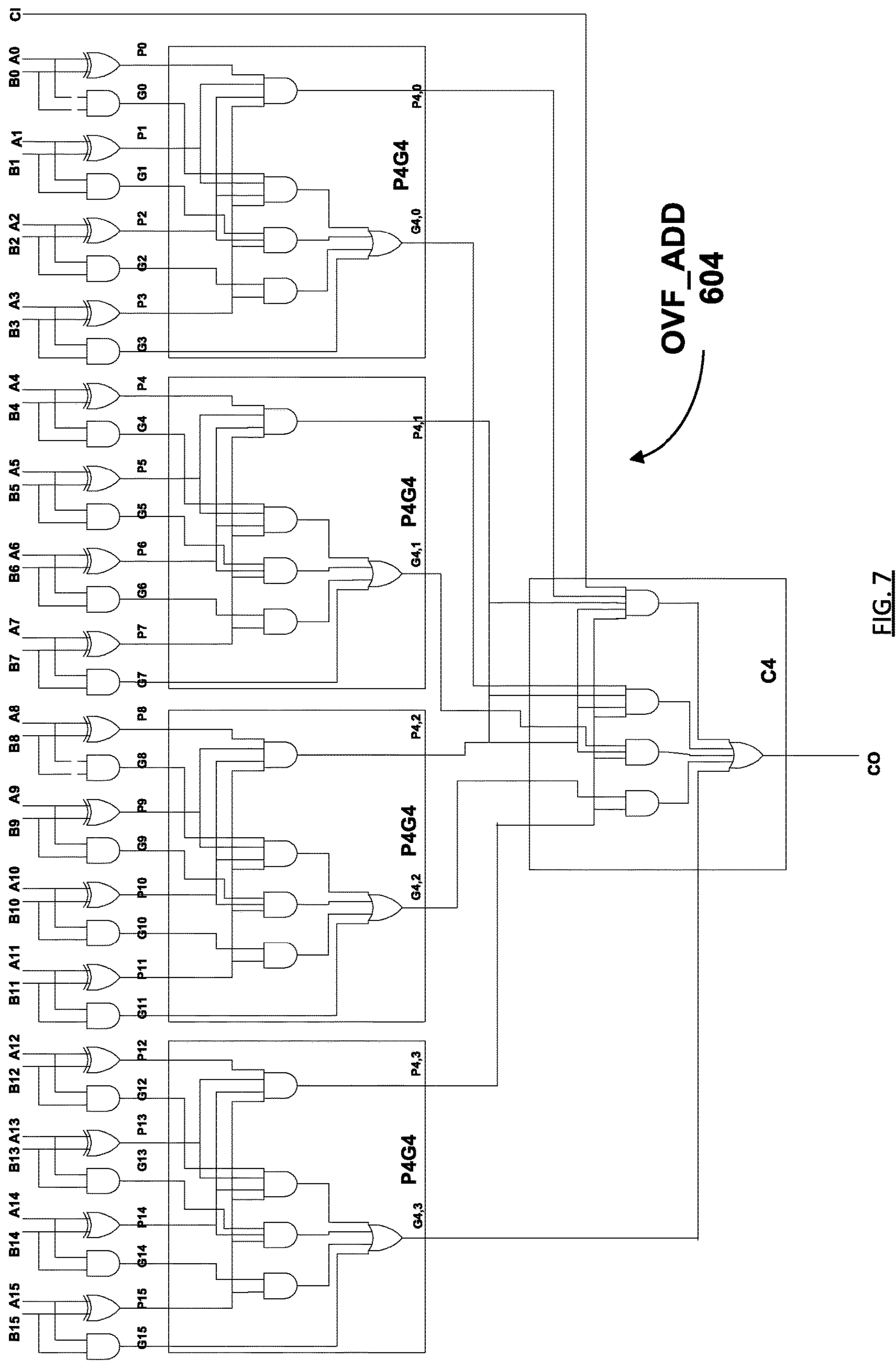
FIG. 7 is a block diagram showing the gate level architecture of a 16-bit adder OVF_ADD that calculates only a carry out (overflow) bit CO, which can be used in the slicer of FIG. 6 according to example embodiments.

FIG. 7 shows an example embodiment of a gate level block circuit diagram of a 16-bit overflow adder circuit OVF_ADD 604 that can be used for the implementation of OVF_ADD 604-1 and 604-2. Input $A_i$ corresponds to S3*c*, input $B_i$ corresponds to C3*c* in the context of OVF-ADD 604-1; Input $A_i$ corresponds to Sc, and input $B_i$ corresponds to Cc in the context of OVF-ADD 604-2. The output CO corresponds to Q3*c* in the case of OFF-ADD 604-1, and Qc in the case of OFF-ADD 604-2.

In OVF-ADD 604, each of the four P4G4 blocks takes 4 pairs of Pi,Gi (i=0, 1, 2, 3 corresponds to the input to the first P4G4 block from right to left, i=4, 5, 6, 7 corresponds to the input to the second P4G4 block, and so on) as input and generates a 2-bit output G4,0 (Generate bit) and P4,0 (Propagate bit). The calculation for G4,0 and P4,0 follows the following 2 equations (these 2 equations are conventionally called parallel prefix function for 4 input):

$P4{,}0=P0.P1.P2.P3$ (the symbol . indicates AND gate)

$G4{,}0=G3+P3.G2+P3.P2.G1+P3.P2.P1.G0$ (the symbol + indicates OR gate)

The calculation of G4,1 and P4,1 are carried out in a similar manner:

$G4{,}0=G2+P2.G1+P2.P1.G0+P2.P1.P0.CI$
$P4{,}1=P4.P5.P6.P7$ $G4{,}1=G7+P7.G6+P7.P6.G5+P7.P6.P5.G4$

The output CO is calculated at block C4, based on the relation:

$C0=(G4{,}3+P4{,}3.G4{,}2+P4{,}3.P4{,}2.G4{,}1+P4{,}3.P4{,}2.P4{,}1.G4{,}0)+P4{,}0.P4{,}1.P4{,}2.P4{,}3.CI$

With respect to LSB processing path 612, the four CSA adders 504 implement the 3 to 2 compression described above in respect of equation (5), to respectively output the values: A1, A2, B1, B2, C1, C2 and D1, D2. In particular, a first CSA adder 504 processes inputs y(n)+3C−T to generate A1 and A2; a second CSA adder 504 processes inputs y(n)+C−T to generate B1 and B2; a third CSA adder 504 processes inputs y(n)−C−T to generate C1 and C2; and a fourth CSA adder 504 processes inputs y(n)−3C−T to generate D1 and D2.

Figure 8:
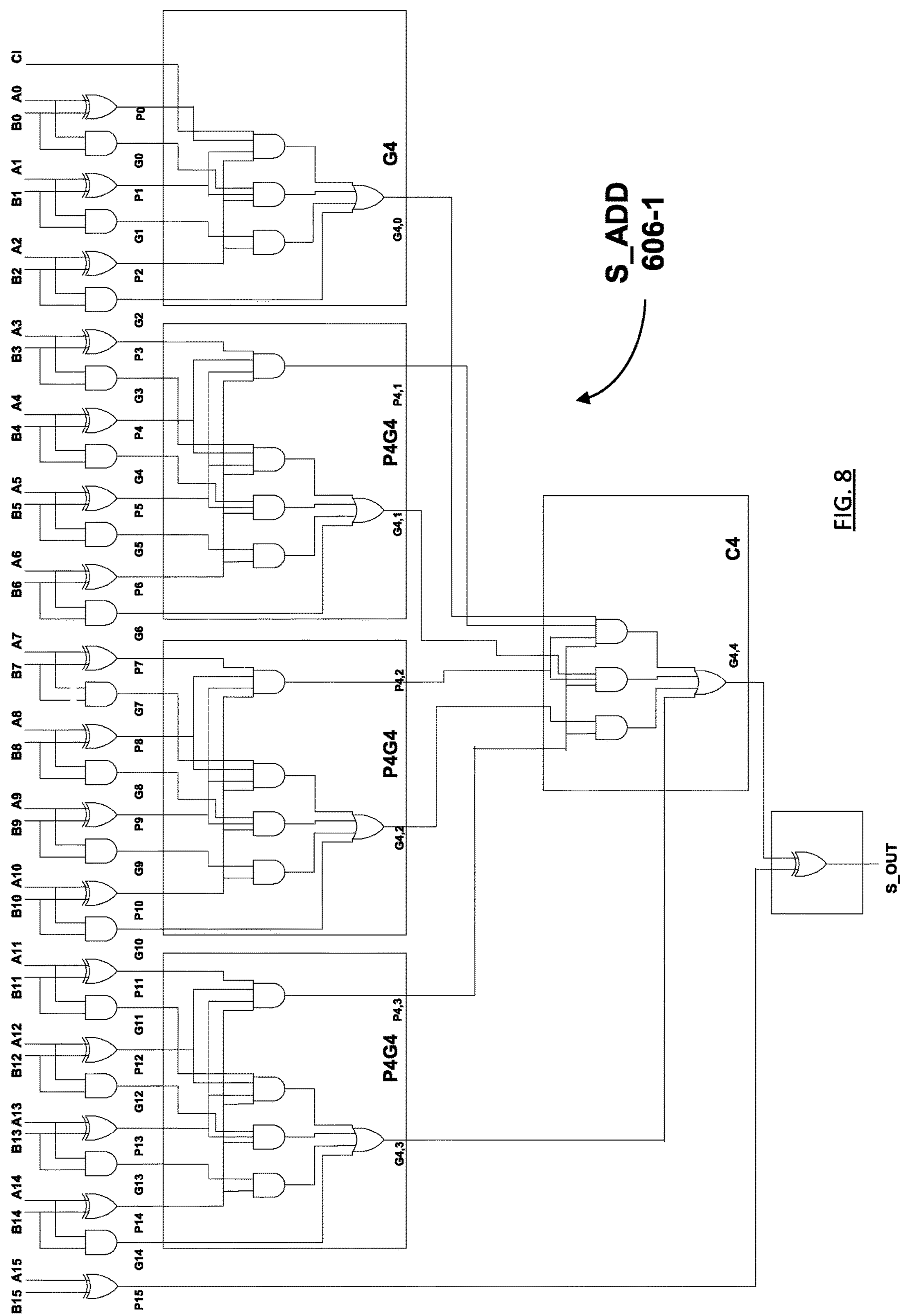
FIG. 8 is a block diagram showing the gate level architecture of a 16-bit adder S_ADD that calculates only the sign bit of the output, which can be used in the slicer of FIG. 6 according to example embodiments.

FIG. 8 shows an example embodiment of a gate level block circuit diagram of a 16-bit sign generating adder circuit S_ADD 604-1 for determining the sign of A1+A2. Circuits S_ADD 604_2 to 604_4 can each be implemented in a similar manner to determine the signs of B1+B2, C1+C2 and D1+D2, respectively.

As shown in FIG. 8, to calculate for the output G4,0 as shown in block G4, the calculation is based on the relation:

$G4{,}0=G2+P2.G1+P2.P1.G0+P2.P1.P0.CI$

Each of the three P4G4 blocks takes 4 pairs of Pi,Gi (i=3, 4, 5, 6 corresponds to the input to the first P4G4 block from right to left, i=7, 8, 9, 10 corresponds to the input to the second P4G4 block, and so on) as input and generates a 2-bit output G4,1 (Generate bit) and P4,1 (Propagate bit). The calculation for G4,1 and P4,1 follows the following equations (conventionally called the parallel prefix function for 4 input):

$P4{,}1=P3.P4.P5.P6$ (the symbol . indicates AND gate)

$G4{,}1=G6+P6.G5+P6.P5.G4+P6.P5.P4.G3$ (the symbol + indicates OR gate)

The calculation of G4,2 and P4,2 are carried out the same way:

$P4{,}2=P7.P8.P9.P10$ $G4{,}2=G10+P10.G9+P10.P9.G8+P10.P9.P8.G7$

To calculate for the output G4,4 as shown in block C4 on second row, the calculation is based on the relationship:

$G4{,}4=(G4{,}3+P4{,}3.G4{,}2+P4{,}3.P4{,}2.G4{,}1+P4{,}3.P4{,}2.P4{,}1.G4{,}0)$

The output of the S_ADD 606-1 (S_OUT, which corresponds to the sign of A1+A2) is equal to:

$S\_OUT=P15\hat{}A\ G4{,}4$ (symbol $A$ represents XOR gate)

LSB generate circuit 608 includes logic gates configured to implement equation sets (6) to (9) described above in order to determine LSB values for Qa(n), Qb(n), Qc(n) and Qd(n) in dependence on the signs of A1+A2, B1+B2, C1+C2 and D1+D2.

In example embodiments, the MSB processing path 610 requires ½($2^{S*N}$) OVF_ADD circuits where N is the number of DFE taps and S is the number of bits in the output symbol x(n), and the LSB processing path 610 requires $2^{S*N}$ S_ADD circuits and $2^{S*N}$ CSA circuits.

Figure 6:
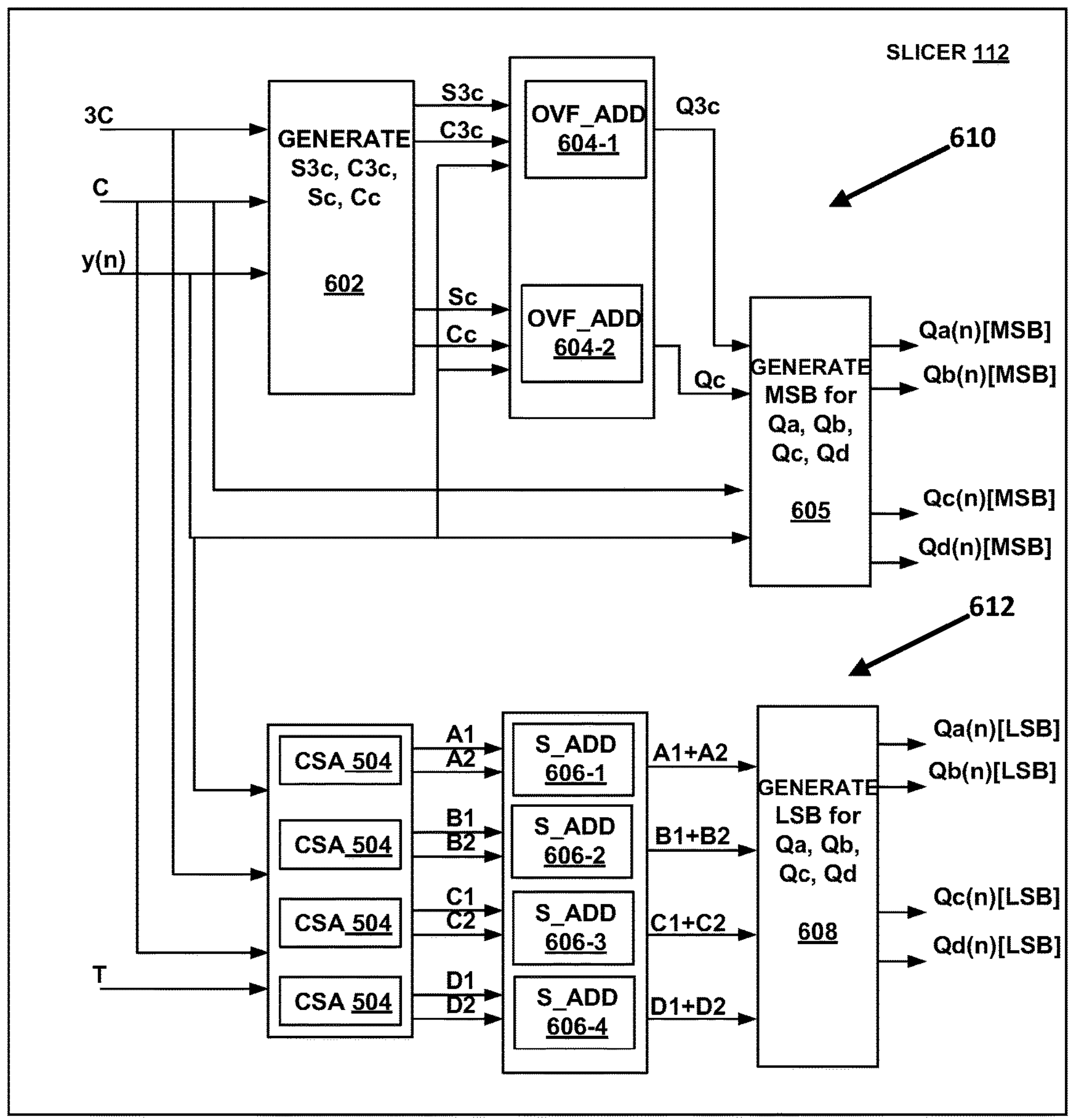
FIG. 6 is a block diagram illustrating a slicer architecture for use in the DFE circuit of FIG. 1B according to an example embodiment.

As can be appreciated form the description above, the total number of adders required in slicer 112 of FIG. 6 to compute the output of the equations in equation set (1) based on the presently described embodiment is 6 adders (for 1-tap, N=1: therefore number of OVF_ADD circuits is $2^2/2$ and number of S_ADD circuits is $2^2$) (compared to 8 adders required using conventional techniques). According, on at least some configurations, the example embodiments described can reduce the total number of additions required by the slicer by 25%.

A similar reduction in additions may also be realized for N-tap look-ahead DFE circuit with the number of taps N>=1 and S>=2. The scaling required to implement cases where N>1 and S>2 will be appreciated by those skilled in the art. For example, for N=2 and S=2, Qa and Qd are expressed as follows (as shown above in respect of equation 1B, on page 4):

$$Q_{a1}(n)=(Y(n)+3C1+3C2)-T$$

$$Q_{a2}(n)=(Y(n)+3C1+C2)-T$$

$$Q_{a3}(n)=(Y(n)+3C1-C2)-T$$

$$Q_{a4}(n)=(Y(n)+3C1-3C2)-T$$

and $$Q_{d1}(n)=(Y(n)-3C1+3C2)-T=(Y(n)-(3C1-3C2))-T$$

$$Q_{d2}(n)=(Y(n)-3C1+C2)-T=(Y(n)-C2))-T$$

$$Q_{d3}(n)=(Y(n)-3C1-C2)-T=(Y(n)-(3C1+C2))-T$$

$$Q_{d4}(n)=(Y(n)-3C1-3C2)-T=(Y(n)-(3C1+3C2))-T$$

where C1 is the tap coefficient for the first tap and C2 is the tap coefficient for the second tap.

As can be seen from the above equations, 8 addition/subtractions would be required conventional slicer configurations to calculate the MSB of Qa1, Qa2, Qa3, Qa4, Qd1, Qd2, Qd3, and Qd4 (the sums between parentheses in the above equations). However, by scaling the slicing architecture disclosed above, the number of addition/subtractions can be reduced to 4. Similar to equation sets (3) and (4) described above, the following algorithm can be applied:

If sign $(y(n))$=sign $(3C1+3C2)$ then $MSB$ of $Qa1$=~sign$(y(n))$ $MSB$ of $Qd4$=~sign$(y(n)-(3C1+3C2))$ Else $MSB$ of $Qa1$=~sign$(y(n)-(3C1+3C2))$ $MSB$ of $Qd4$=~sign$(y(n))$ Similarly, If sign $(y(n))$=sign $(3C1+C2)$ then $MSB$ of $Qa2$=~sign$(y(n))$ $MSB$ of $Qd3$=~sign$(y(n)-(3C1+C2))$ Else $MSB$ of $Qa2$=~sign$(y(n)-(3C1+C2))$ $MSB$ of $Qd3$=~sign$(y(n))$ Qa3, Qa4, Qd2, Qd1 can be calculated the same way. Calculations for MSB of Qb and Qc can be carried out in the same fashion.

For LSB calculations in the case of N=2, S=2, instead of 3 to 2 compression using 3:2 CSA circuits, 4:2 CSA circuits can be used to reduce 4 elements into 2 elements and then S_ADD circuits (16 bit S_ADD) used to determine the LSBs of Qa, Qb, Qc, and Qd. Thus, in the case of N=1, 3:2 CSA circuits are used to compress three element additions to two element additions; each additional tap increases the number of elements in the addition equation by 1, thus in the case of N=2, 4:2 CSA circuits are used to compress four element additions into two element additions, in the case of N=3, 5:2 CSA circuits are used to compress five element additions into two element additions, and so on.

Figure 9:
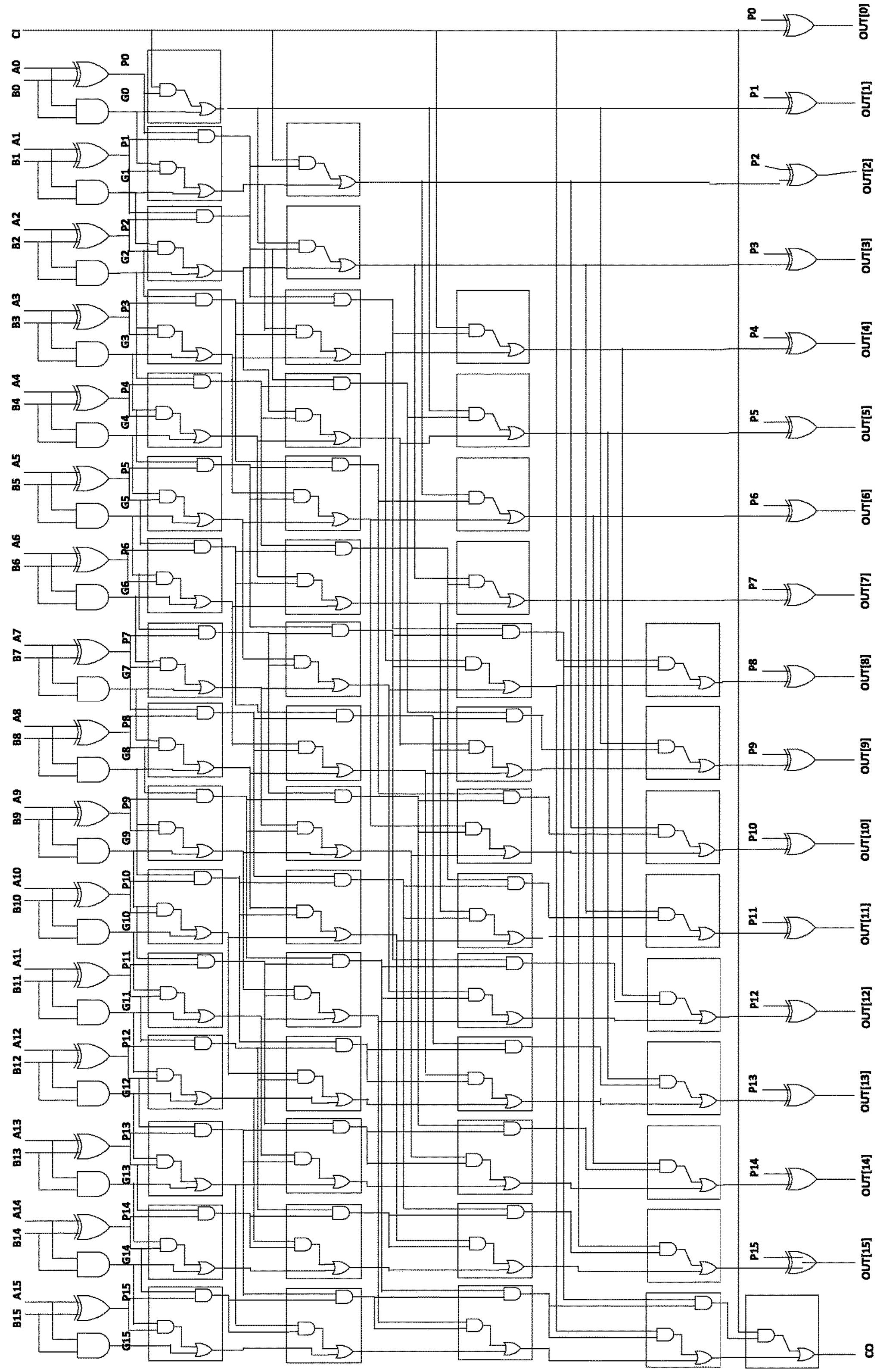
FIG. 9 illustrates the gate level architecture of a known 16-bit Kogg-Stone adder.

For comparison, FIG. 9 illustrates an architecture of a conventional 16-bit Kogg-Stone adder to contrast with the example embodiment of adder (OVF_ADD 604) shown in FIG. 7. As noted above OVF_ADD 604 calculates the overflow bit CO to be used to determine the MSB of Qa(n), Qb(n), Qc(n), and Qd(n), according to example embodiments, is illustrated in FIG. 7. In particular, the gate level block circuit diagram shown in FIG. 7 depicts the adder 604 (OVF_ADD) that computes the carry out bit CO (overflow bit) of two 16-bit input data sets.

In example embodiments, the circuit of adder OVF_ADD 604 is configured to achieve a short critical path while using minimal hardware resources. In this regard, the adder 604 can be compared to the conventional adder of FIG. 9. By comparison the OVF_ADD adder 604 of FIG. 7 has shorter delay paths and uses substantially less logic resources.

As noted above, the calculations of the LSBs of Qa(n), Qb(n), Qc(n), and Qd(n) can be carried out using similar techniques. First, 4 CSAs are provided to perform 3 to 2 compression for the input data shown in equation (5). The next step is to determine the sign of the sum (A1+A2), (B1+B2), (C1+C2), (D1+D2). To calculate the sign of these sums, an adder that calculates only the sign of the output sum (S_ADD 606) has been described. Example embodiments of adder S_ADD 606 have also been configured to achieve a short critical path while using minimum hardware resources. The gate level block circuit diagram of FIG. 8 is an example embodiment of an adder (S_ADD) 606-1 that computes the sign bit OUT (15) of two 16-bit input data sets.

As can be appreciated from the adder circuits of FIGS. 7 and 8 relative to the circuit of FIG. 9, the hardware and critical path lengths of the OVF_ADD and the S_ADD adder circuits are substantially less than those of the Kogg-Stone adder. Comparison results of gate counts of the OVF_ADD and the S_ADD adder circuits 400, 600 compares to the 16-bit Kogg-Stone adder of FIG. 5 are listed in Table I and Table II, below:

TABLE I

Comparison of gate counts between a 16-bit Kogg-Stone adder and the 16-bit OVF_ADD circuit:

| | OVF_ADD | Kogg-Stone |
|---|---|---|
| AND2/OR2 | 21 | 160 |
| AND3,4/OR3,4 | 19 | 0 |
| XOR | 17 | 32 |
| Total Gate Counts | 147 | 368 |

TABLE II

Comparison of gate counts between a 16-bit Kogg-Stone adder and the S_ADD circuit:

| | S_ADD | Kogg-Stone |
|---|---|---|
| AND2/OR2 | 21 | 160 |
| AND3,4/OR3,4 | 20 | 0 |
| XOR | 16 | 32 |
| Total Gate Counts | 145 | 368 |

TABLE III

Comparison of gate counts between a 16-bit Kogg-Stone adder and 2 OVF_ADD+4 s_ADD +4 CSA architecture used to implement 1-tap PAM-4 slicer implementation.

| | 2 OVF_ADD + 4 S_ADD+4 CSA | 8 Kogg-Stone |
|---|---|---|
| AND2/OR2 | 318 | 1280 |
| AND3,4/OR3,4 | 118 | 0 |
| XOR | 244 | 256 |
| Total Gate Counts | 1748 | 2944 |

In example embodiments, the slicer configuration disclosed herein can be used in the implementation of unrolled/unfolded (look-ahead) DFE circuits. The slicer is implemented using adder architectures that, in at least some configurations, are characterized by small logic depths that enable fast propagation of signals from input of the slicer circuit to output of the slicer circuit. Furthermore, the adder architectures require low logic resources for slicer circuit implementations. In particular, in at least some configurations the small logic depth enables the critical path of the OVF_ADD and S_ADD adders 604, 606 to be shorter than the paths of conventional adders, with the result that shortened input to output delay path may assist high circuit throughput performance. In example embodiments, hardware requirements can be reduced as usage only an overflow bit and sign bit are needed for the equalization and slicing process, and thus the OVF_ADD and S_ADD adder circuit configurations can enable slicer circuit implementations using less logic resources, which may reduce power consumption. Such a slicer may for example be applied in a high throughput backplane receiver application.

In some embodiments, the slicer architecture described herein may use less adders—for example, $\frac{1}{2}*(2^{S*N})+(2^{S*N})$ overflow and sign adders, compared to $2*(2^{S*N})$ regular adders used in conventional designs. The slicers can be applied to N-tap, S-bit symbol look-ahead DFE designs, including for example S=2-bit, $4^N$ unrolled levels, which will require a total of ½ of $4^N$ overflow adders instead of $4^N$ adders to compute MSBs and total of $4^N$ sign adders instead of $4^N$ conventional adders to compute LSBs.

Although the present disclosure may describe methods and processes with steps in a certain order, one or more steps of the methods and processes may be omitted or altered as appropriate. One or more steps may take place in an order other than that in which they are described, as appropriate.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

What is claimed is:

1. A slicer circuit for use in a N-tap, S-bit symbol look-ahead decision feedback equalizer (DFE) circuit configured to receive a signal sample y(n) and generate a corresponding estimated output symbol x(n), the slicer circuit comprising:

a first processing path for generating, based on the signal sample y(n), a most significant bit (MSB) for each of $2^{S*N}$ possible output symbols of the DFE circuit, the first processing path including $(2^{S*N})/2$ overflow adder circuits; and a second processing path for generating, based on the signal sample y(n), a least significant bit (LSB) for each of the $2^{S*N}$ possible output symbols, the second processing path including $2^{S*N}$ sign adder circuits, wherein N is the number of taps in the DFE circuit and S is the number of bits in the estimated output symbol x(n).

2. The slicer circuit of claim 1 wherein:

the first processing path includes a temporary value generate circuit preceding the overflow adder circuits and a generate MSB circuit following the overflow adder circuits, the temporary value generate circuit being configured to generate, based on a sign of the signal sample y(n), $(2^{S*N})/2$ temporary value sets each comprising a temporary sum and a temporary carry value, each of the overflow adder circuits being configured to determine, for a respective temporary value set, a respective overflow bit resulting from addition of the temporary sum and temporary carry value of the temporary value set, the generate MSB circuit being configured to generate the most significant bit (MSB) for each of the $2^{S*N}$ possible output symbols based on the sign of the signal sample y(n) and the overflow bits determined by the overflow adder circuits.

3. The slicer circuit of claim 2 wherein S=2, N=1 and the signal sample y(n) represents a PAM 4 signal, the temporary value generate circuit being configured to generate a first set of temporary values comprising a first temporary sum $S_{3c}$ and a first temporary carry value $C_{3c}$ and a second set of temporary values comprising a second temporary sum $S_c$ and a second temporary carry value $C_c$, the temporary values being determined by:

If sign $(y(n))$=sign $(C)$ then:

$$S_{3C}=\overline{3C} \text{ and } C_{3C}=1$$

$$S_C=\overline{C} \text{ and } C_C=1$$

Else $$S_{3C}=3C \text{ and } C_{3C}=0$$

$$S_C=C \text{ and } C_C=0,$$

where C is a tap coefficient.

4. The slicer circuit of claim 3 wherein a first of the overflow adder circuits is configured to generate a first overflow bit $Q_{3c}$ from an addition of $y(n)+S_{3c}+C_{3c}$ and a second of the overflow adder circuits is configured to generate a second overflow bit $Q_c$ from an addition of $y(n)+S_c+C_c$.

5. The slicer circuit of claim 4 wherein the generate MSB circuit is configured to generate an MSB for each of four possible symbol outputs Qa(n), Qb(n), Qc(n) and Qd(n) in accordance with:

If sign $(y(n))$=sign $(C)$ then:

$Qa(n)_{MSB}=1$ if $y(n)>0$ else $Qa(n)_{MSB}=0$ $Qb(n)_{MSB}=1$ if $y(n)>0$ else $Qb(n)_{MSB}=0$ $Qc(n)_{MSB}=1$ if $Q_C>0$ else $Qc(n)_{MSB}=0$ $Qd(n)_{MSB}=1$ if $Q_{3c>}0$ else $Qd(n)_{MSB}=0$ else $Qa(n)_{MSB}=1$ if $Q_{3C}>0$ else $Qa(n)_{MSB}=0$ $Qb(n)_{MSB}=1Qc>0$ else $Qb(n)_{MSB}=0$ $Qc(n)_{MSB}=1$ if $y(n)>0$ else $Qc(n)_{MSB}=0$ $Qd(n)_{MSB}=1$ if $y(n)>0$ else $Qd(n)_{MSB}=0$.

6. The slicer circuit of claim 2 wherein the second processing path includes $2^{S*N}$ carry save adder (CSA) circuits preceding the sign adder circuits and a generate LSB circuit following the sign adder circuits, the CSA circuits each being configured to compress multi-element additions into a corresponding compressed additions having fewer elements, the multi-element additions comprising the signal sample y(n), a slicer threshold T and N tap coefficients as elements, each of the sign adder circuits being configured to determine a respective sign resulting from addition of a respective one of the compressed additions, the generate LSB circuit being configured to generate the LSB for each of the $(2^{S*N})$ possible output symbols based on the signs determined in respect of the compressed additions.

7. The slicer circuit of claim 6 wherein S=2, N=1 and the signal sample y(n) represents a PAM 4 signal, and there are four possible output symbols Qa(n), Qb(n), Qc(n) and Qd(n), wherein the CSA adder circuits are configured to compress 3 element additions to corresponding 2 element additions as represented by:

$Q_a[n]=(y[n]+3C)-T \Rightarrow A1+A2$ $Q_b[n]=(y[n]+C)-T \Rightarrow B1+B2$ $Q_c[n]=(y[n]-C)-T \Rightarrow C1+C2$ $Q_d[n]=(y[n]-3C)-T \Rightarrow D1+D2$ where C is a tap coefficient.

8. The slicer circuit of claim 7 wherein the sign adder circuits are configured to determine the signs resulting from the additions A1+A2, B1+B2, C1+C2 and D1+D2.

9. The slicer circuit of claim 8 wherein the generate LSB circuit is configured to generate an LSB for each of four possible symbol outputs Qa(n), Qb(n), Qc(n) and Qd(n) in accordance with:

if $A1+A2>0$ $Q_a(n)[LSB]$='1' else $Q_a(n)[LSB]$='0' if $B1+B2>0$ $Q_b(n)[LSB]$='1' else $Q_b(n)[LSB]$='0' if $C1+C2>0$ $Q_c(n)[LSB]$='1' else $Q_c(n)[LSB]$='0' if $D1+D2>0$ $Q_d(n)[LSB]$='1' else $Q_d(n)[LSB]$='0'.

10. A method for slicing a received signal sample y(n) to generate a plurality of possible output symbols in an N-tap, S-bit symbol look-ahead decision feedback equalizer (DFE) circuit, comprising;

generating, using $(2^{S*N})/2$ overflow adder circuits and based on the received signal sample y(n), a most significant bit (MSB) for each of $2^{S*N}$ possible output symbols of the DFE circuit; and generating, using $2^{S*N}$ sign adder circuits and based on the received signal sample y(n), a least significant bit (LSB) for each of the $2^{S*N}$ possible output symbols, wherein N is the number of taps in the DFE circuit and S is the number of bits in an output symbol of the DFE circuit.

11. The method of claim 10 wherein:

generating the MSB for each of the possible output symbols comprises:

generating, based on a sign of the signal sample y(n), $(2^{S*N})/2$ temporary value sets each comprising a temporary sum and a temporary carry value;

determining, using a respective one of the overflow adder circuits for each of the temporary value sets, a respective overflow bit resulting from addition of the temporary sum and temporary carry value of the temporary value set; and generating the most significant bit (MSB) for each of the $2^{S*N}$ possible output symbols based on the sign of the signal sample y(n) and the overflow bits determined by the overflow adder circuits.

12. The method of claim 11 wherein generating a least significant bit (LSB) for each of the $2^{S*N}$ possible output symbols, comprises:

compressing a three element addition into a corresponding two element addition, the three elements of the three element addition comprising the signal sample y(n), a slicer threshold T and a tap coefficient;

determining, using a respective one of the adder circuits for each of the two element additions, a respective sign resulting from addition of the two element additions; and generating the LSB for each of the $2^{S*N}$ possible output symbols based on the signs determined in respect of the two element additions.

13. An N-tap, S-bit look-ahead decision feedback equalizer (DFE) circuit configured to receive a signal sample y(n) and generate a corresponding estimated output symbol x(n), the DFE circuit comprising:

- a slicer circuit configured to generate possible output symbols of the DFE based on the signal sample y(n), a slicer threshold T and N tap coefficients C1 . . . CN, the slicer circuit including:
  - a first processing path for generating, based on the signal sample y(n), slicer threshold T and tap coefficients C1 . . . CN, a most significant bit (MSB) for each of the possible output symbols of the DFE circuit, the first processing path including $\frac{1}{2}(2^{S*N})$ overflow adder circuits, and
  - a second processing path for generating, based on the signal sample y(n), slicer threshold T and tap coefficients C1 . . . CN, a least significant bit (LSB) for each of the possible output symbols of the DFE circuit, the second processing path including $2^{S*N}$ sign adder circuits; and
- a multiplexer configured to, based on a previously estimated output signal, selectively output the estimated output symbol x(n) from among the possible output symbols generated by the slicer circuit, wherein N is the number of taps in the DFE circuit and S is the number of bits in the estimated output symbol x(n).

14. The DFE circuit of claim 13 wherein:

- the first processing path includes a temporary value generate circuit preceding the overflow adder circuits and a generate MSB circuit following the overflow adder circuits,
- the temporary value generate circuit being configured to generate, based on a sign of the signal sample y(n), $(2^{S*N})/2$ temporary value sets each comprising a temporary sum and a temporary carry value,
- each of the overflow adder circuits being configured to determine, for a respective temporary value set, a respective overflow bit resulting from addition of the temporary sum and temporary carry value of the temporary value set,
- the generate MSB circuit being configured to generate the most significant bit (MSB) for each of the $2^{S*N}$ possible output symbols based on the sign of the signal sample y(n) and the overflow bits determined by the overflow adder circuits.

15. The DFE circuit of claim 14 wherein S=2, N=1 and the signal sample y(n) represents a PAM 4 signal, the temporary value generate circuit being configured to generate a first set of temporary values comprising a first temporary sum $S_{3c}$ and a first temporary carry value $C_{3c}$ and a second set of temporary values comprising a second temporary sum $S_c$ and a second temporary carry value $C_c$, the temporary values being determined by:

If sign $(y(n))$=sign $(C)$ then:

$S_{3C}=\overline{3C}$ and $C_{3C}=1$ $S_C=\overline{C}$ and $C_C=1$

Else $S_{3C}=3C$ and $C_{3C}=0$ $S_C=C$ and $C_C=0$.

16. The DFE circuit of claim 15 wherein a first of the overflow adder circuits is configured to generate a first overflow bit $Q_{3c}$ from an addition of $y(n)+S_{3c}+C_{3c}$ and a second of the overflow adder circuits is configured to generate a second overflow bit $Q_c$ from an addition of $y(n)+S_c+C_c$.

17. The DFE circuit of claim 16 wherein the generate MSB circuit is configured to generate an MSB for each of four possible symbol outputs Qa(n), Qb(n), Qc(n) and Qd(n) in accordance with:

If sign $(y(n))$=sign $(C)$ then:

$Qa(n)_{MSB}=1$ if $y(n)>0$ else $Qa(n)_{MSB}=0$ $Qb(n)_{MSB}=1$ if $y(n)>0$ else $Qb(n)_{MSB}=0$ $Qc(n)_{MSB}=1$ if $Q_C>0$ else $Qc(n)_{MSB}=0$ $Qd(n)_{MSB}=1$ if $Q_{3c>}0$ else $Qd(n)_{MSB}=0$ else $Qa(n)_{MSB}=1$ if $Q_{3C}>0$ else $Qa(n)_{MSB}=0$ $Qb(n)_{MSB}=1Qc>0$ else $Qb(n)_{MSB}=0$ $Qc(n)_{MSB}=1$ if $y(n)>0$ else $Qc(n)_{MSB}=0$ $Qd(n)_{MSB}=1$ if $y(n)>0$ else $Qd(n)_{MSB}=0$.

18. The DFE circuit of claim 13 wherein the second processing path includes $(2^{S*N})$ carry save adder (CSA) circuits preceding the sign adder circuits and a generate LSB circuit following the sign adder circuits,

- the CSA circuits each being configured to compress a multi-element addition into a corresponding compressed addition having a fewer number of additions, the multi-element addition comprising the signal sample y(n), slicer threshold T and N tap coefficients as elements,
- each of the sign adder circuits being configured to determine a respective sign resulting from addition of a respective one of the compressed additions,
- the generate LSB circuit being configured to generate the LSB for each of the $2^{S*N}$ possible output symbols based on the signs determined in respect of the compressed additions.

19. The DFE circuit of claim 18 wherein S=2, N=1 and the signal sample y(n) represents a PAM 4 signal, and there are four possible output symbols Qa(n), Qb(n), Qc(n) and Qd(n), wherein the CSA adder circuits are configured to compress a 3 element additions to a corresponding 2 element additions as represented by:

$Q_a[n]=(y[n]+3C)-T \Rightarrow A1+A2$ $Q_b[n]=(y[n]+C)-T \Rightarrow B1+B2$ $Q_c[n]=(y[n]-C)-T \Rightarrow C1+C2$ $Q_d[n]=(y[n]-3C)-T \Rightarrow D1+D2$ where C is a tap coefficient.

20. The DFE circuit of claim 19 wherein the sign adder circuits are configured to determine the signs resulting from the additions A1+A2, B1+B2, C1+C2 and D1+D2 and the generate LSB circuit is configured to generate an LSB for each of four possible symbol outputs Qa(n), Qb(n), Qc(n) and Qd(n) in accordance with:

if $A1+A2>0$ $Q_a(n)[LSB]$='1' else $Q_a(n)[LSB]$='0' if $B1+B2>0$ $Q_b(n)[LSB]=$ '1' else $Q_b(n)[LSB]=$ '0' if $C1+C2>0$ $Q_c(n)[LSB]=$ '1' else $Q_c(n)[LSB]=$ '0' if $D1+D2>0$ $Q_d(n)[LSB]=$ '1' else $Q_d(n)[LSB]=$ '0'.

* * * * *